(No Model.)

W. H. COLLINGS.
CONSTRUCTION AND OPERATION OF VACUUM PANS.

No. 335,430. Patented Feb. 2, 1886.

Witnesses:
Alex. Barkoff
John E. Parker.

Inventor
William H. Collings
by his Attorneys
Howson and Sons

UNITED STATES PATENT OFFICE.

WILLIAM H. COLLINGS, OF COLLINGSWOOD, NEW JERSEY.

CONSTRUCTION AND OPERATION OF VACUUM-PANS.

SPECIFICATION forming part of Letters Patent No. 335,430, dated February 2, 1886.

Application filed December 24, 1885. Serial No. 186,588. (No model.)

*To all whom it may concern:*

Be it known that I, WILLIAM H. COLLINGS, a citizen of the United States, residing in Collingswood, Camden county, New Jersey, have invented certain Improvements in the Construction and Operation of Vacuum-Pans, of which the following is a specification.

The object of my invention is to provide for the feeding and discharging of a vacuum-pan without interfering with the operation of the same, and this object I attain by maintaining in the pan a column of liquid supported by the pressure of the atmosphere upon said liquid at the discharge, so that when fresh liquid is added there will be a discharge of a like amount in order to restore the equilibrium.

Figure 2:
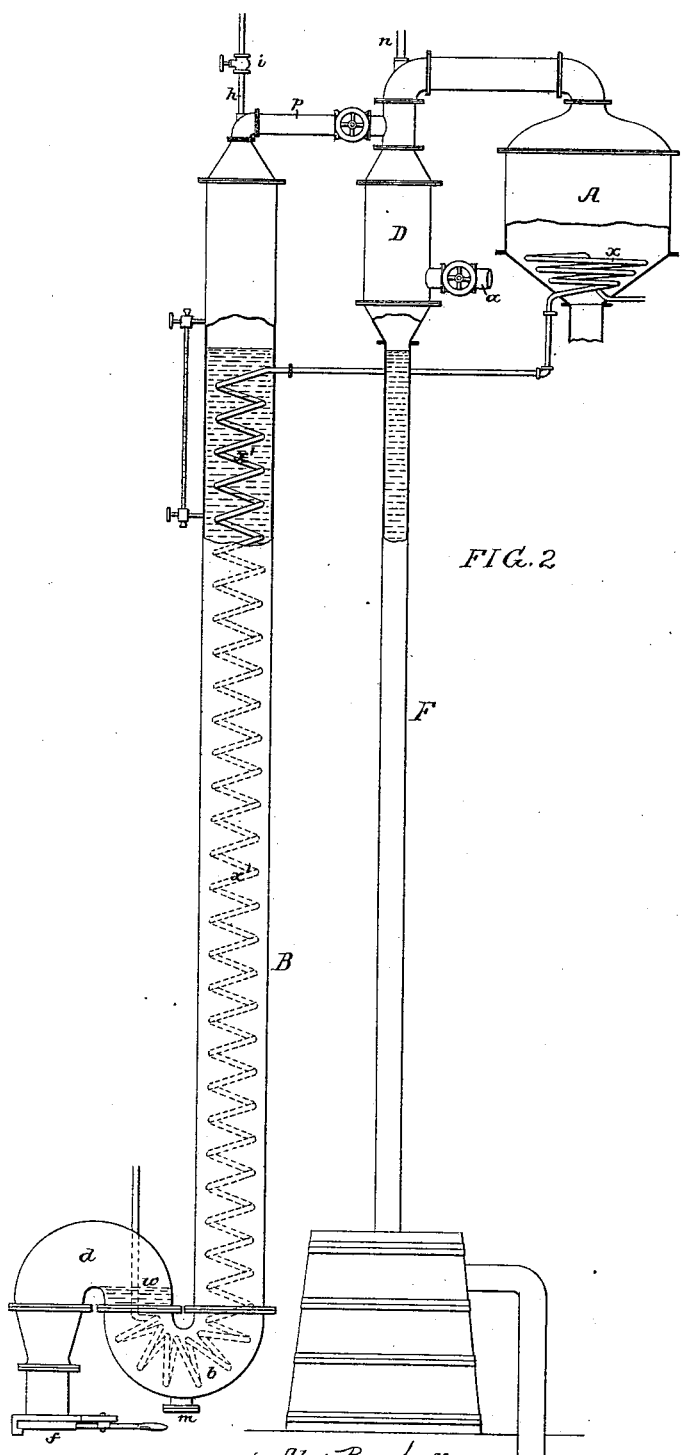
Figure 1:
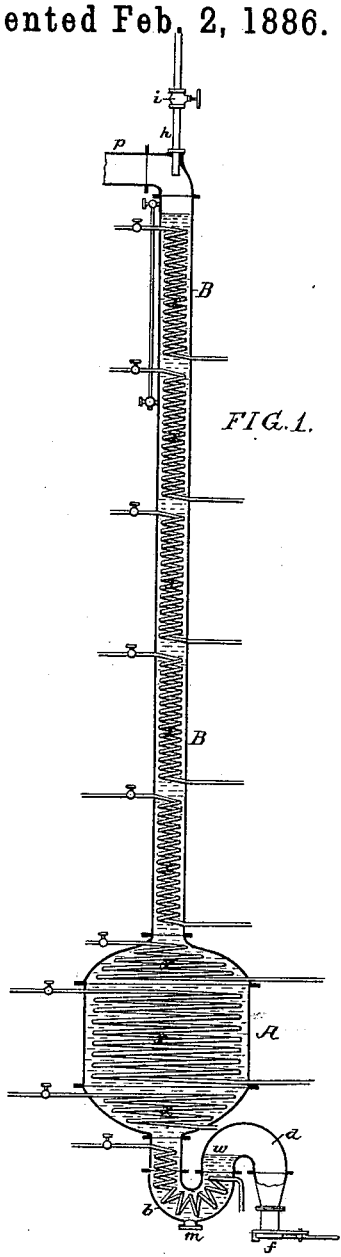

In the accompanying drawings, Figure 1 is a sectional view of a vacuum-pan, showing one method of constructing the same for carrying out my invention; and Fig. 2 a side view, partly in section, showing another form of vacuum-pan in accordance with my invention, and illustrating a special application of the same as a condenser for sweet waters.

In Fig. 1, A represents a vacuum-pan, the casing of which may be similar to that of a pan of ordinary construction, the pan containing a series of steam-heating coils, $x$, whereby heat is applied to the liquid contents of the same. From the top of the pan projects a tube, B, which also contains a series of steam-coils, $x$, and which should communicate at the upper end with the usual condenser, D, with air-pump connection $a$, as shown in Fig. 2, so that a partial vacuum can be maintained in the pan and its extension B. The discharge-pipe at the bottom of the pan is connected to a return-bend, $b$, which, in connection with a reverse return-bend, $d$, forms an S-trap, the discharge end of which is provided with a gate or other valve, $f$. With the upper end of the tube B communicates the supply-pipe $h$, having a valve, $i$, and in starting the pan the valve $f$ is closed and the valve in the supply-pipe opened, so as to permit the liquid to flow into the pan, and at the same time the connection with the air-pump or other exhausting device is opened, so as to provide for the formation of a partial vacuum in the pan. As soon as this partial vacuum is established the discharge-valve $f$ may be opened, the pressure of air upon the surface of the liquid at $w$ serving to prevent any escape of said liquid from the pan until the column in the tube B reaches such a height that the weight of the liquid is greater than will be supported by the pressure of air, whereupon there will be a lowering in the height of the column and a discharge through the trap until the equilibrium is restored. I am thus enabled to effect the feeding and discharging of the pan without any interruption in the working of the same. For instance, in treating sugar the sugar-liquor may be allowed to flow into the pan at intervals until the desired point of granulation is reached, whereupon fresh liquor may be introduced at the top of the column until the granulated mass is discharged and a new supply of liquid takes its place; or the operation of the pan may be continuous, the inlet of liquor at the top of the column being regulated so as to effect any desired rate of discharge from the pan, and thus govern the degree of density imparted to the liquid. When it is desired to empty the pan, air may be allowed to enter the upper end of the tube B, whereupon the entire contents of the pan will flow from the same by gravity, and will be discharged, with the exception of that portion remaining in the bend $b$, which can be withdrawn through the opening $m$.

In Fig. 2 I have shown a special application of my improved vacuum-pan in connection with an ordinary vacuum-pan, for the purpose of condensing sweet waters, A being the vacuum-pan, D the condenser communicating therewith, F the pipe for the water-column, $a$ the valved connection with the air-pump or other exhauster, and $n$ the pipe for supplying the condenser-jet. In this case my improved vacuum-pan is shown as being composed entirely of a tube, B, having an S-trap and valved discharge-pipe at the lower end, and communicating at the upper end through a pipe, $p$, with the condenser D. The sweet waters are supplied to the tube B through the valved pipe $h$, and are heated by a steam-coil, $x'$, which recives the waste from the lower coil, $x$, of the vacuum-pan A, this waste having a temperature high enough to effect the desired concentration of the sweet waters, so that the operation is conducted without the expense involved in the use of live steam for the purpose.

The supplementary pan may have more than one coil, each coil receiving the waste from one of the coils of the main pan; but the consrtuction shown is deemed the preferable one.

I claim as my invention—

1. The mode herein described of operating a vacuum-pan, said mode consisting in maintaining a column of liquid in the pan by atmospheric pressure, all substantially as specified.

2. The mode herein described of operating a vacuum-pan, said mode consisting in maintaining a column of liquid in the pan by atmospheric pressure, and feeding fresh liquid to the column, so as to disturb the equilibrium and cause a discharge sufficient to restore the same, all substantially as specified.

3. A vacuum-pan having an upward extension wherein a column of liquid can be maintained by atmospheric pressure upon the surface of the liquid at the discharge, all substantially as specified.

4. A vacuum-pan having an upward extension, B, and a trapped discharge-pipe, all substantially as specified.

5. The combination of a vacuum-pan having an upward extension, B, a supply-pipe at the upper end of the latter, and an outlet-pipe having a trap, all substantially as specified.

6. The combination of a vacuum-pan having an upper extension, B, with heating-coils in said pan and extension, all substantially as specified.

7. The combination of a vacuum-pan having a trapped discharge-pipe with heating-coils in said pan and discharge-pipe, all substantially as specified.

8. The combination of a vacuum-pan and its heating coil or coils with a supplementary vacuum-pan containing a heating coil or coils receiving the waste from the coil or coils of the main pan, all substantially as specified.

In testimony whereof I have signed my name to this specification in the presence of two subscribing witnesses.

WM. H. COLLINGS.

Witnesses:
WILLIAM F. DAVIS,
HARRY SMITH.